United States Patent
Yamaji

[11] Patent Number: 5,963,005
[45] Date of Patent: Oct. 5, 1999

[54] CONTROLLER FOR A STEPPING MOTOR

[75] Inventor: Shukou Yamaji, Tokyo, Japan

[73] Assignee: Fujitsu Takamisawa Component Limited, Tokyo, Japan

[21] Appl. No.: 09/152,273

[22] Filed: Sep. 14, 1998

[30] Foreign Application Priority Data

Feb. 4, 1998 [JP] Japan ................................. 10-023394

[51] Int. Cl.⁶ ............................. H02P 8/38; B41J 29/38
[52] U.S. Cl. ......................... 318/685; 318/705; 318/714
[58] Field of Search .................................. 318/685, 696, 318/700, 701, 705, 712, 714

[56] References Cited

U.S. PATENT DOCUMENTS

| | | | |
|---|---|---|---|
| 3,577,176 | 5/1971 | Kreithen et al. | 318/432 |
| 3,601,678 | 8/1971 | Abraham et al. | 318/685 |
| 4,215,302 | 7/1980 | Chiang | 318/696 |
| 4,642,543 | 2/1987 | MacMinn | 318/696 |
| 4,658,194 | 4/1987 | Richter et al. | 318/696 |
| 4,831,319 | 5/1989 | Heinrich et al. | 318/696 |

FOREIGN PATENT DOCUMENTS 63-87198  4/1988  Japan.

*Primary Examiner*—Bentsu Ro
*Attorney, Agent, or Firm*—Staas & Halsey

[57] ABSTRACT

The present invention provides a controller with a function of detecting status to be losing synchronism for a stepping motor driven by constant-current system. A current controller 404 applies the driving-current to a stepping motor 401 in accordance with the command derived from a control unit 407. The applied current is observed by a current measuring unit 403, and stored in a current observing unit 409 in response to the sampling signals generated from a sampling signal generating unit 408. After an excitation has completed, the observing waveform is compared with a predetermined reference waveform in the control unit, and it is determined that a loss of synchronism occurs in the stepping motor when these do not agree within a predetermined tolerance.

22 Claims, 10 Drawing Sheets

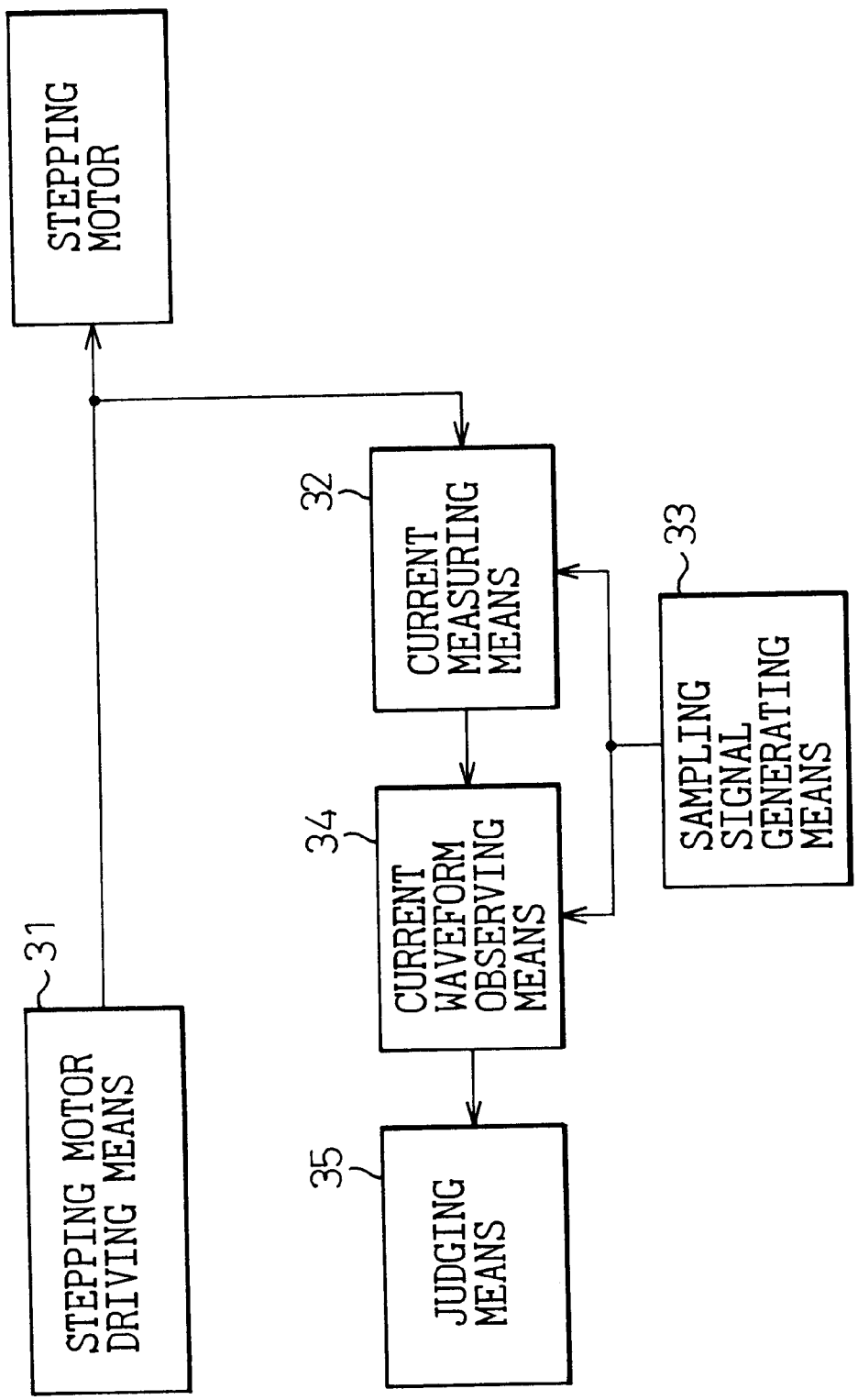

CONTROLLER FOR A STEPPING MOTOR

TECHNICAL FIELD

The present invention relates to a controller for a stepping motor or, more especially, to a controller with a function of detecting a loss of synchronism in a stepping motor driven by a constant-current driving system.

BACKGROUND ART

A stepping motor is one which is turned a fixed angle by a pulse derived from a driving unit, and generally applied to a printer, which is installed in a portable terminal, as a driving unit.

The rotor of a stepping motor is rotated by magnetic attraction and magnetic repulsion generated between the rotor and the exciting coils which are wound on the a stator and excited in sequence, and it is feared that an abnormal rotating condition of the rotor, that is, a loss of synchronism is caused by fluctuation of the driving load and/or the voltage. Therefore, it becomes necessary to surely detect a loss of synchronism, because behavior such as disturbed printing is caused when a loss of synchronism occurs.

Hitherto, a constant-voltage exciting system was generally used for exciting the exciting coils of a stepping motor, and a detector to detect a loss of synchronism for constant-voltage exciting system has already been proposed (See Unexamined Patent Application (Kokai) No. 63-87198).

FIG. 1 is a circuit diagram of a detector to detect a loss of synchronism, and one terminal of an exciting coil 11 is grounded through a control transistor 12 and a resistor for measuring a current 13, and the other terminal is connected to a DC bus $V_{cc}$. An exciting pulse is applied to the base of the control transistor 12.

The voltage across the resistor for measuring a current 13 is applied to one input terminal of a comparator 14, and is compared with a reference voltage generated by a reference voltage source 15 which is applied to the other input terminal of the comparator 14.

As an exciting pulse is applied to the trigger terminal of a monostable flip-flop 16, the monostable flip-flop 16 outputs a pulse, the width thereof being determined by the resistance value of a timer resistor 17 and the capacity of a timer capacitor 18.

The output of the monostable flip-flop 16 and the output of the comparator 14 are applied to an AND gate 19.

In the above circuit, a loss of synchronism is detected when the output of the AND gate 19 goes to a "H" level when the output of the comparator is reversed, that is, when the current through the exciting coil 11 becomes larger than the fixed reference value.

Though the constant-voltage exciting system has a simple structure and a low price, it is feared that the stepping motor loses synchronism when the stepping motor is rotated at high speed.

To solve the above problem, a constant-current exciting system which controls the current though the exciting coil to a fixed value has already been proposed.

FIG. 2 is a circuit diagram of the constant-current exciting system, and one terminal of the exciting coil 21 is grounded through a control transistor 22 and a resistor for measuring a current 23, and the other terminal thereof is applied to a DC bus $V_{cc}$.

An exciting pulse is applied to a chopper circuit 24, and a exciting current measured by the resistor for measuring a current 23 is also fedback to the chopper circuit 24.

Recently, it is required not only to rotate at high speed, but also to surely detect a loss of synchronism when it occurs because a stepping motor is widely used.

It is, however, impossible to detect a loss of synchronism by detecting that the exciting current becomes larger than a fixed reference value, because the exciting current through the exciting coil is controlled to the constant value.

DISCLOSURE OF THE INVENTION

Accordingly, the object of the present invention is to provide a controller with a function of detecting a loss of synchronism in a stepping motor driven by a constant-current exciting system.

FIG. 3 is a basic structural diagram of a controller for a stepping motor according to the present invention, and there is provided a controller for a stepping motor comprising a stepping motor driving means 31 for applying exciting pulses to the exciting coils of the stepping motor, a current measuring means 32 for measuring a current though the exciting coils of the stepping motor in response to the exciting pulses derived from said stepping motor driving means 31, a sampling command generating means 33 for generating sampling command every predetermined fixed period while said stepping motor driving means 31 is applying exciting pulses, a current waveform observing means 34 for fetching and storing the exciting current measured by said current measuring means 32 every time a sampling command is generated by said sampling signal generating means 33, and a determining means 35 for determining that the stepping motor has lost synchronism when the current waveform observed by said current waveform observing means 34 does not agree with a predetermined reference waveform within a predetermined fixed tolerance after a exciting pulse has been applied by said stepping motor driving means 31.

According to a controller for a stepping motor of the present invention, a loss of synchronism is detected by fetching the exciting current every predetermined period while a exciting pulse is being applied, and comparing it with a reference waveform after an excitation has been completed.

BRIEF DESCRIPTION OF THE DRAWINGS

FIG. 3 is a basic block diagram of the present invention.

BEST MODE FOR CARRYING OUT THE INVENTION

Figure 1:
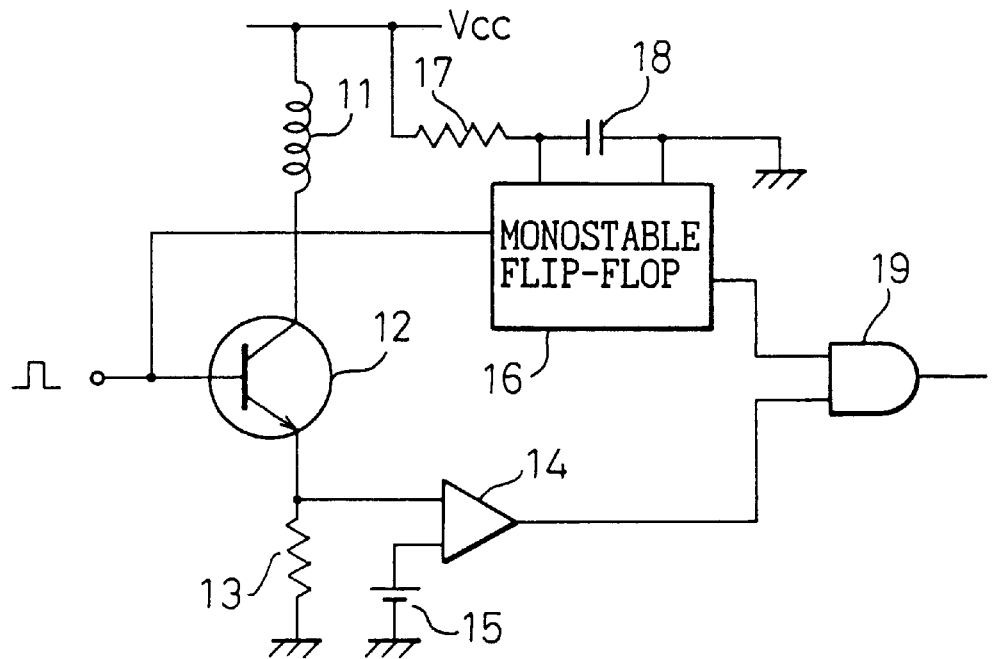
FIG. 1 is a circuit diagram of a detector to detect a loss of synchronism for a constant-voltage exciting system.
Figure 2:
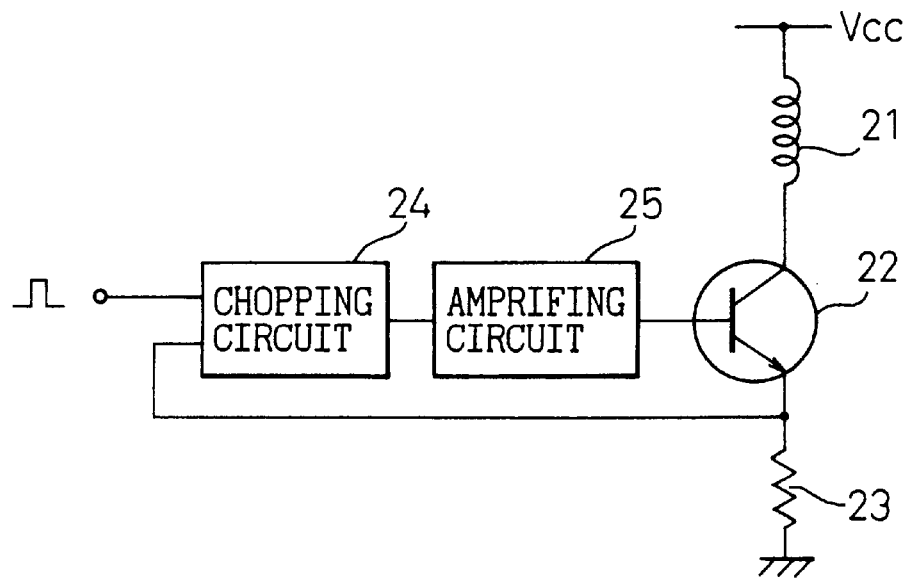
FIG. 2 is a circuit diagram of a constant current exciting system.
Figure 4B:
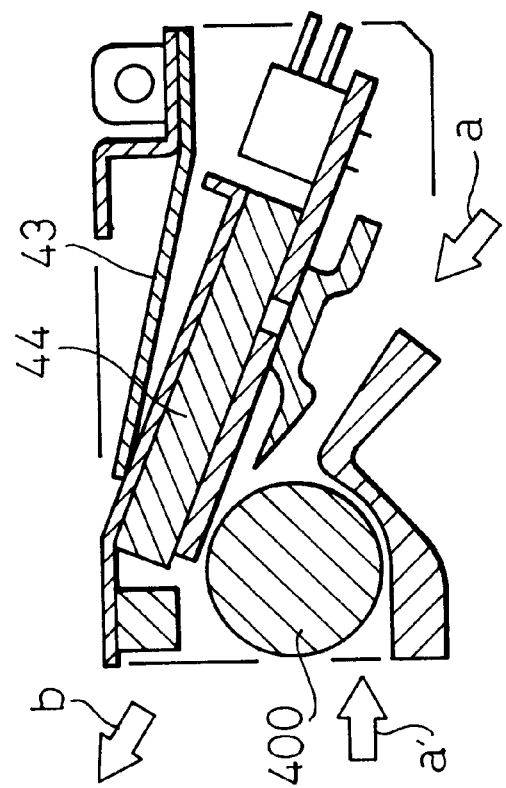
FIGS. 4(a) and (b) are an oblique view and a cross section diagram of a thermal printer.
Figure 4A:
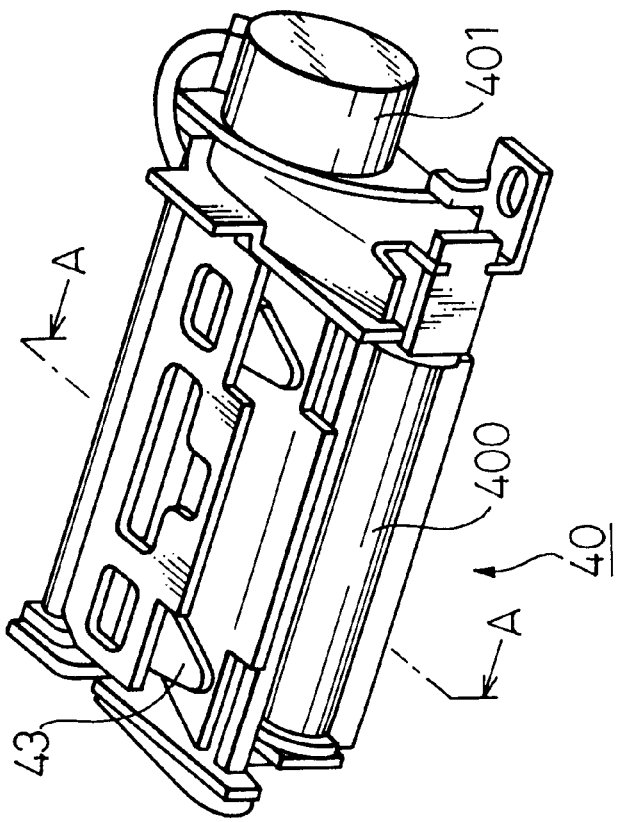

FIG. 4 is an oblique view (a) and a cross section diagram (b) across a line A—A' of a thermal printer 40 driven by a stepping motor, and a platen 400 is rotated by the stepping motor 401.

That is, a thermosensible paper is supplied into the thermal printer 40 along an arrow "a" or "a'", and discharged along an arrow "b". Printing on the thermosensible paper is started when a thermal head 44 is pressed on the thermosensible paper by a head pressing spring 43.

Figure 5:
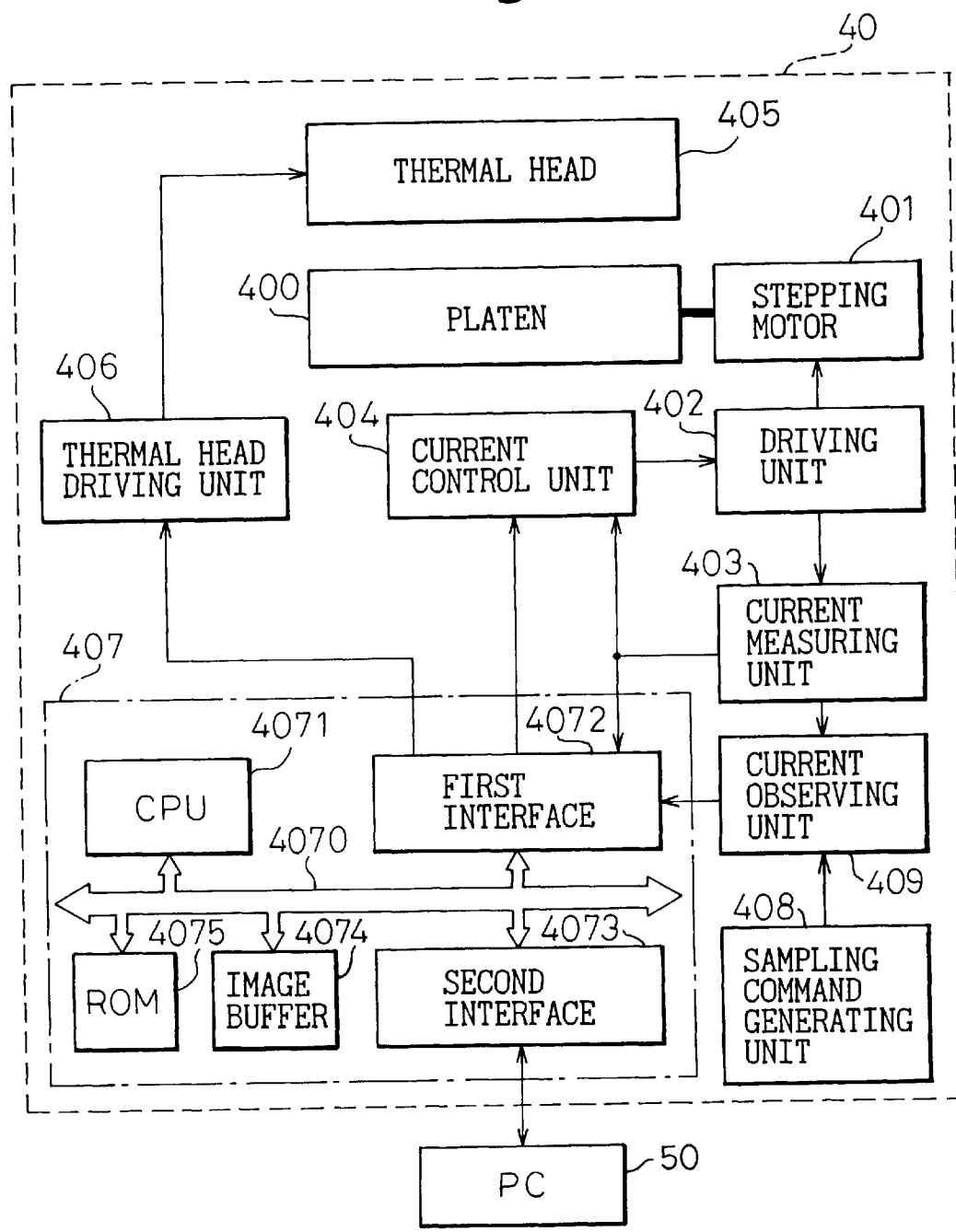
FIG. 5 is a block diagram of a preferred embodiment.

FIG. 5 is a block diagram of a controller for the stepping motor of a preferred embodiment according to the present invention, and the thermal printer is connected to a host computer, for example, a personal computer (PC) 50.

The thermal printer is comprised of the platen 400 for feeding a thermosensible paper, the stepping motor 401 for rotating the platen 400, a driving unit 402 for controlling an exciting current which excites the stepping motor 401, a current measuring unit 403 for measuring the exciting current, a current control unit 404 for generating control signal applied to the driving unit 402, a thermal head 405 for printing characters transferred from the PC 50 on the thermosensible paper, a thermal head driving unit 406 for applying controlling the thermal head 405, a control unit 407, a sampling signal generating unit 408, and a current observing unit 409. Note, the driving unit 402, the current measuring unit 403, the current control unit 404 and the current observing unit 409 is installed corresponding to each exciting coil of the stepping motor.

The control unit 407 is a micro processor system, and comprised of a bus 4070, CPU 4071, a first interface 4072, a second interface 4073, an image buffer 4074 and a non-volatile memory 4075.

To the first interface 4072, the current measuring unit 403, the current control unit 404, the thermal head driving unit 406 and the current observing unit 409 are connected. PC 50 is connected to the second interface 4073.

The image buffer 4074 is used as a temporary buffer to store characters transferred from PC 50 before printing.

Figure 6:
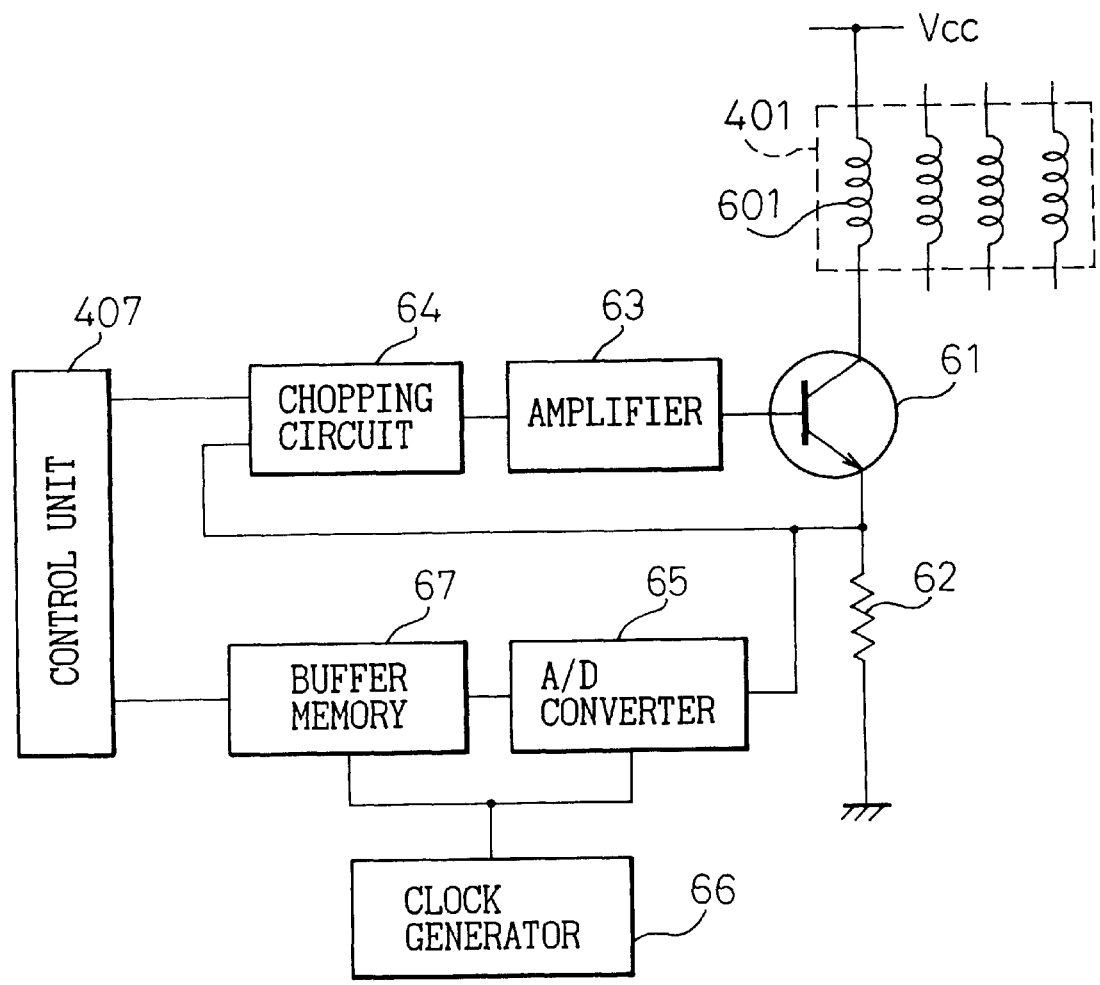
FIG. 6 is a circuit diagram of a main part of a preferred embodiment.

FIG. 6 is a circuit diagram of a main part of a preferred embodiment, and shows a control circuit for a phase-A exciting coil 601 of the stepping motor 401.

One terminal of the exciting coil 601 is connected to a DC bus $V_{cc}$, and the other terminal is connected to the collector of a control transitor 61. The emitter of the control transitor 61 is grounded though a resistor for measuring the current 62. Note, the control transitor 61 corresponds to the driving unit 402, and the resistor for measuring the current 62 corresponds to the current measuring unit 403.

The base of the control transitor 61 is connected to a chopping circuit 64 through a amplifier 63. The chopping circuit 64 receives a command signal derived from the control unit 407, and a feedback signal which is an exciting current measured by the resistor for measuring the current 62. Note, the amplifier 63 and the chopping circuit 64 correspond to the current control unit 404.

The exciting current measured by the resistor for measuring the current 62 is also applied to an A/D converter 65. The A/D converter 65 digitizes the exciting current by sampling it every clock pulse, for example 100 micro seconds pulse, generated by a clock generator 66, and its output is stored in a buffer memory 67. Note, the exciting current stored in the buffer memory 67 is transferred to the control unit 407.

The clock generator 66 corresponds to the sampling command generating unit 408, and the A/D converter 65 and the buffer memory 67 correspond to the current observing unit 409.

Figure 7:
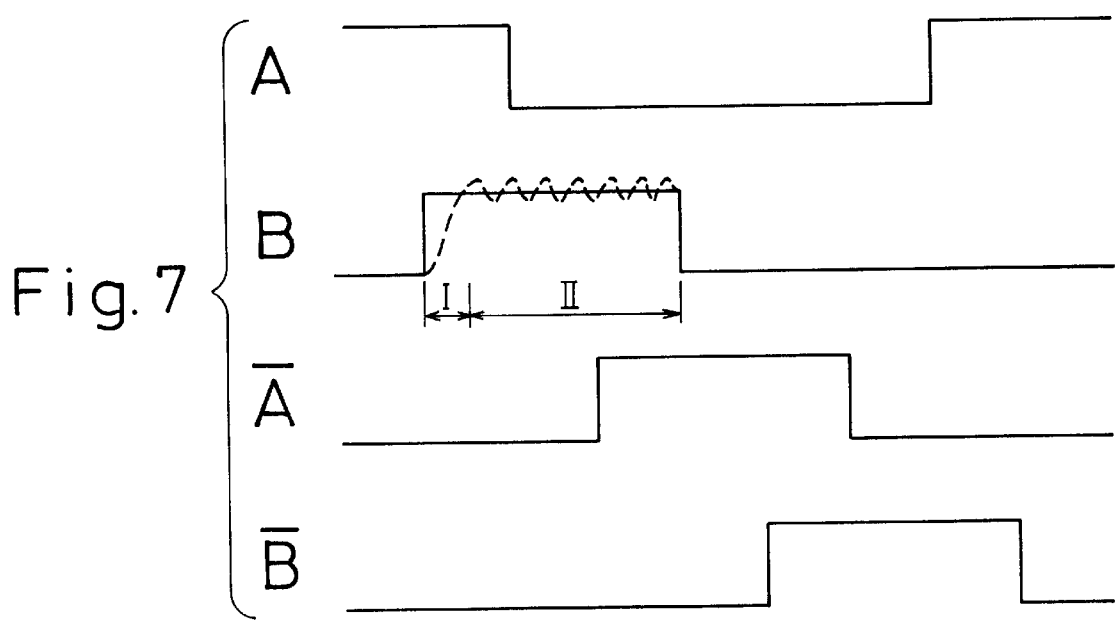
FIG. 7 is an exciting pattern of a single-dual phase exciting system.

FIG. 7 is a exciting pattern when applying a single-dual phase exciting system for a stepping motor with four (4) exciting coils. A pulse width of each exciting pulse is equal to three (3) steps of the stepping motor and phase difference between two exciting pulses is equal to two (2) steps. Note, a width, an amplitude and a period is programmed in the control unit 407 according to the exciting method.

The clock generator 66 generates sampling pulses every predetermined interval, for example, 100 micro seconds. The A/D converter 65 converts the current measured by the resistor for measuring the current 62 to digitized data in response to the sampling pulses, and the digitized data is stored in the buffer memory 67.

A dotted line in (B) of FIG. 7 shows the waveform of the exciting current through the exciting coil when the stepping motor is rotated at comparatively low speed. A section I represents a transient response section, and a section II represents a chopping control section.

That is, the exciting current rises like a first-order lag in the section I, and oscillates around a fixed current because of the chopping control in section II, when a DC voltage is applied to a series connection of the exciting coil and the resistor.

Figure 8:
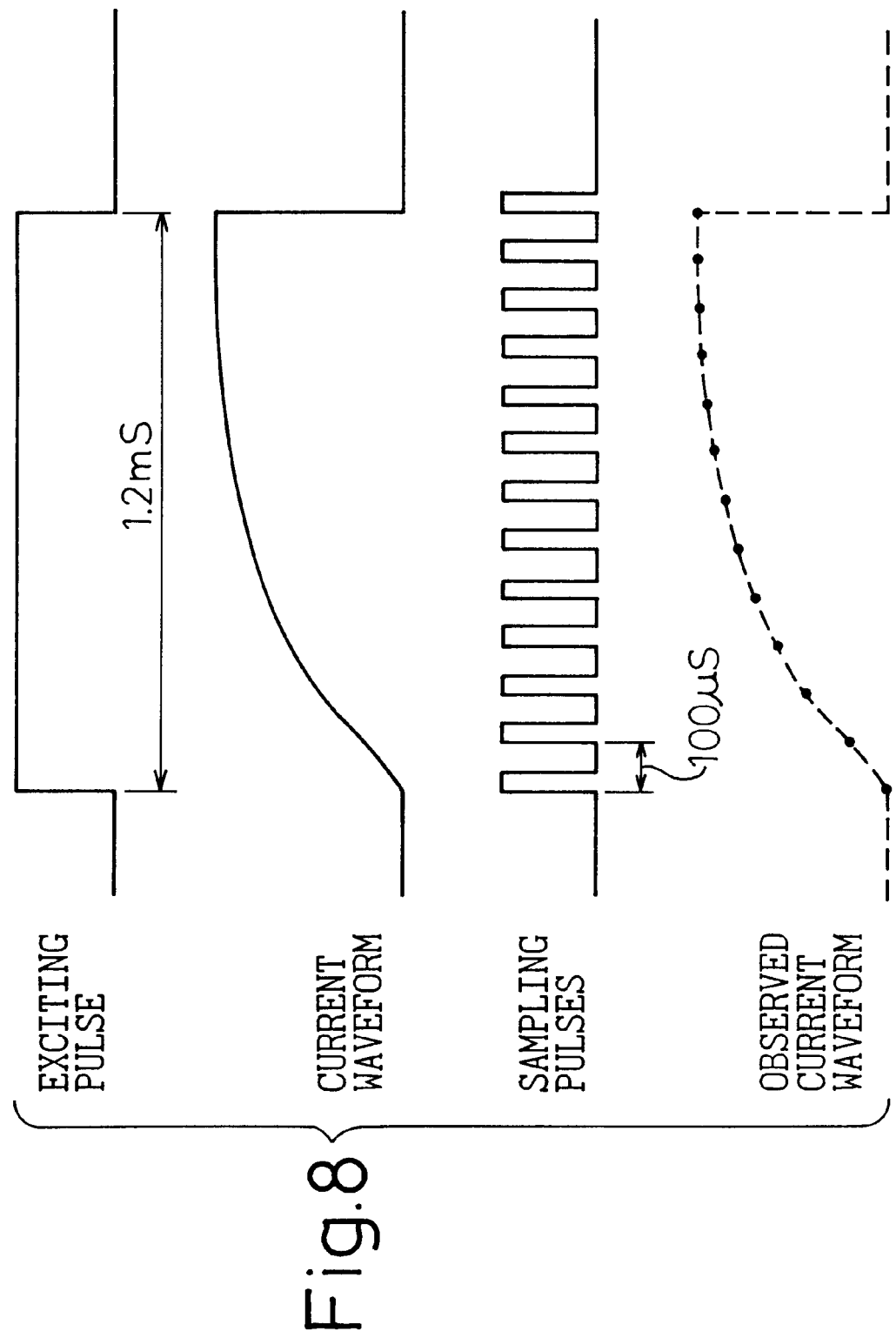
FIG. 8 is a waveform when rotating at high speed.

FIG. 8 is a waveform when the stepping motor is rotated at high speed, and shows an exciting pulse, the current through the exciting coil, sampling pulses, and the measured current waveform respectively.

When the stepping motor is driven normally, the exciting current responds like a first-order lag, and the measured current waveform becomes a time series data which is sampled from the first-order lag response every 100 micro seconds. Note, an excitation is completed before the exciting current is controlled at a constant level by the chopping control when the stepping motor is rotated at high speed.

Figure 9:
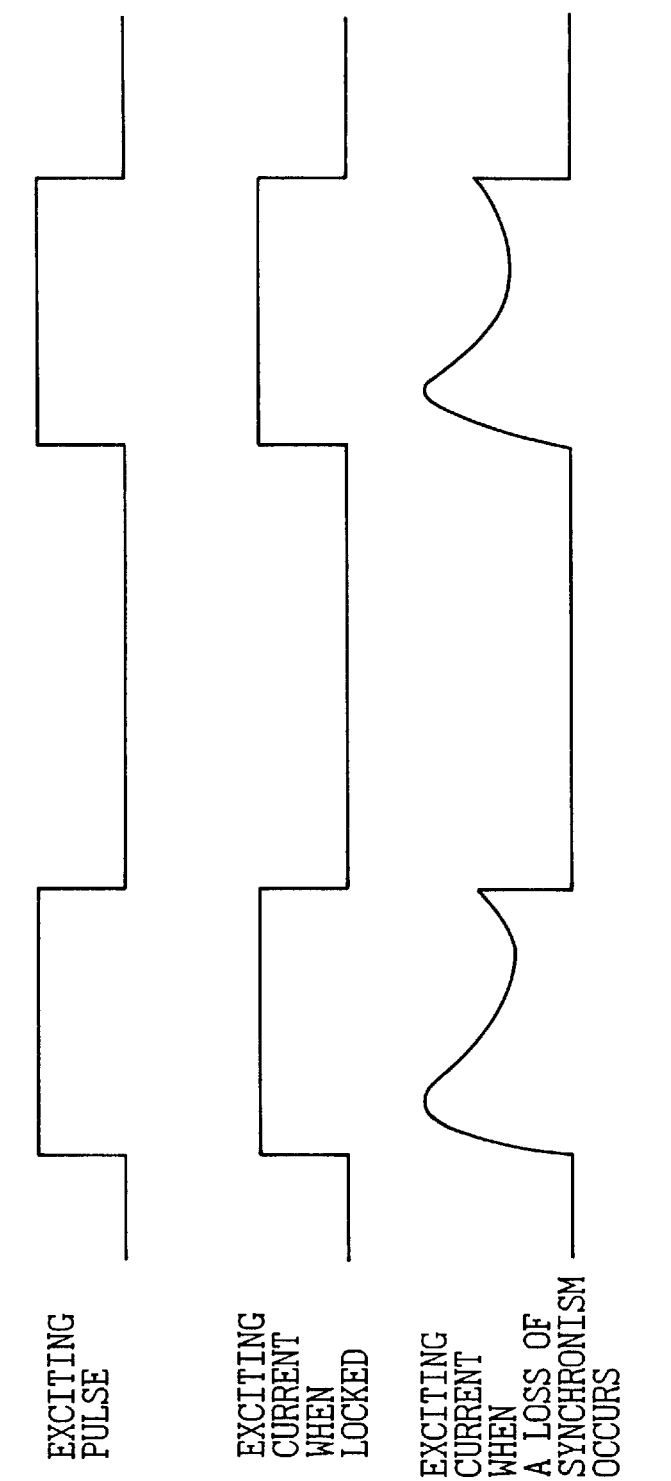
FIG. 9 is a waveform when not rotating correctly.

FIG. 9 is a waveform when the stepping motor is not rotated normally, and shows an exciting pulse, a current waveform when the stepping motor is locked, and a current waveform when the stepping motor loses synchronism, respectively. That is, the exciting current has the almost same shape as the exciting pulse when the stepping motor is locked, and a bumpy shape which rises sharply at first, and drops thereafter when the stepping motor loses synchronism.

Based on FIGS. 8 and 9, it is understood that whether or not the stepping motor is normally rotated can be determined by comparing the waveform observed by the current observing unit 409 with the waveform when the stepping motor is rotated normally.

Figure 10:
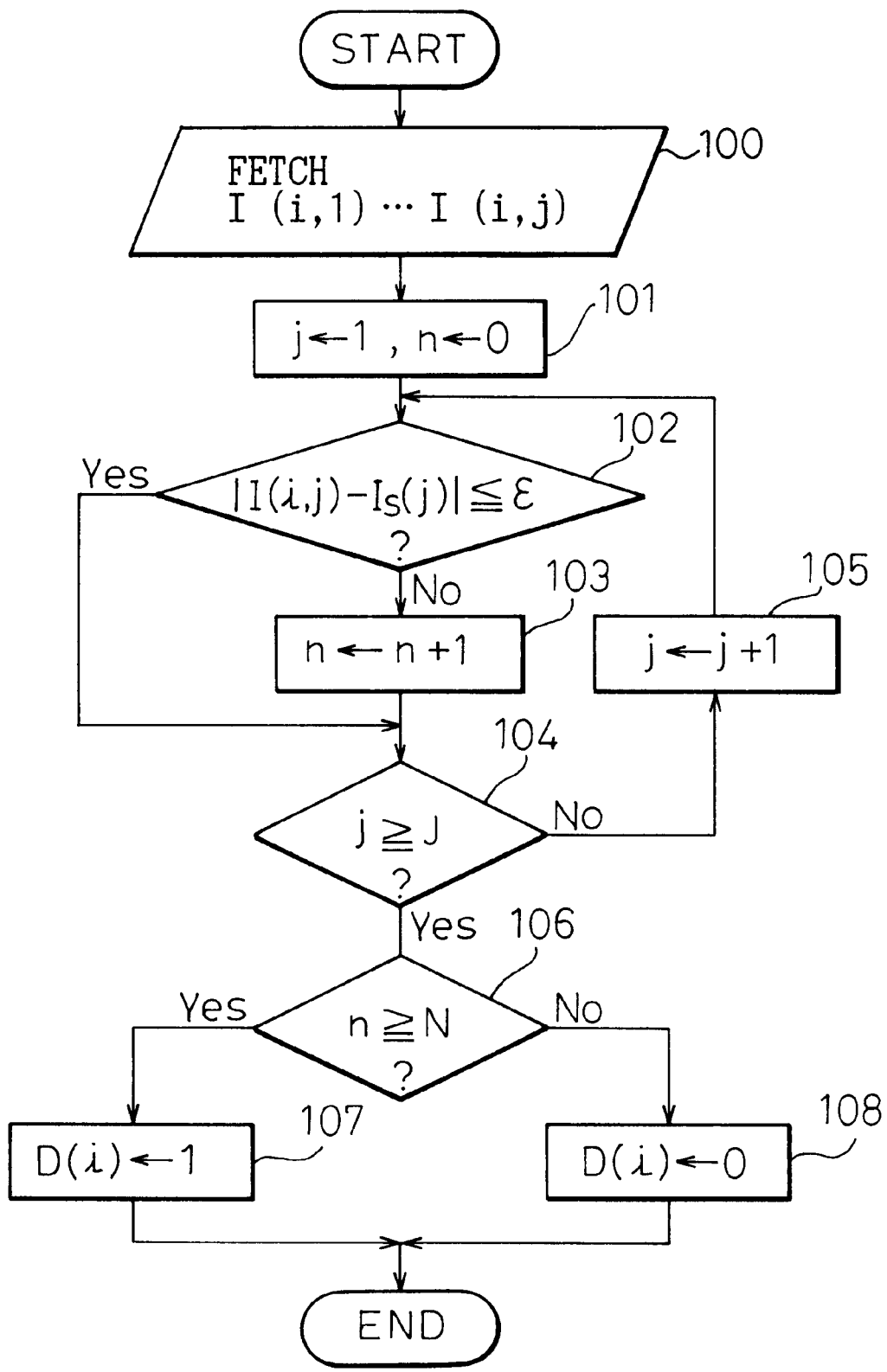
FIG. 10 is a flowchart of a routine to detect a loss of synchronism.

FIG. 10 is a flowchart of a routine to detect a loss of synchronism, and this routine is executed in the control unit 407 every time the excitation of the i-th exciting coil has been completed. For example, i=1 represents phase-A, i=2 represents phase-B, i=3 represents inverse phase-A, and i=4 represents inverse phase-B when the above four coils is excited by a single-dual phase exciting system.

At step 100, the time series data I(i,1), I(i,2) . . . I(i,J) which is stored in the buffer memory 67 are fetched.

At step 101, one index j which represents the order of the sampling is initialized to "1" and the other index n which represents the number of times of occurrences of a loss of synchronism is initialized to "0". At step 102, it is determined whether or not the absolute value of the difference between one observed current data I(i,j) and the j-th reference value $I_s$ (j) is smaller than a fixed tolerance $\epsilon$.

The exciting circuit is a series connection of the exciting coil 601 and the resistance for measuring a current 62, and the j-th reference value $I_s$ (j) can be determined by using the following equation, because the section I is very short and the applied voltage can be assumed constant.

$$I_s(j) = V_0\{1 - e^{-R(jT)/L}\}/R \quad [1]$$

Where,

V₀=the exciting voltage

R=the resistance value of the resistor for measuring the current

L=the inductance of the exciting coil

T=sampling period

When the determination at step 102 is negative, that is, when the absolute value of the difference is larger than the fixed tolerance ε, the control proceeds to step 104 after the index "n" is incremented at step 103. Conversely, when the determination at step 102 is affirmative, that is, when the absolute value of the difference is smaller than the fixed tolerance ε, the control proceeds directly to step 104.

At step 104, it is determined whether or not the sampling index "j" reaches the maximum "J", and the control returns to step 102 when the determination at step 104 is negative after the sampling index "j" is incremented at step 105.

When the determination at step 104 is affirmative, that is, when the sampling index "j" reaches the maximum "J", it is determined whether or not the index "n" reaches a fixed number "N" at step 106. When the determination at step 106 is affirmative, this routine is terminated after the flag D(i) which represents the condition of the i-th phase is set to "1" at step 107 because a loss of synchronism occurs in the i-th phase. Note, if it is determined that a loss of synchronism occurs when some one of observed current data I(i,j) deviates from the reference value, the fixed number "N" is set to "1", but if a sure determination is required, the fixed number "N" is set to more than "2".

Conversely, when the determination at step 106 is negative, that is, when the index "n" is smaller than "N", this routine is terminated after the i-th loss of synchronism flag D(i) is set to "0" at step 108 because a loss of synchronism does not occur at the i-th phase.

Figure 11:
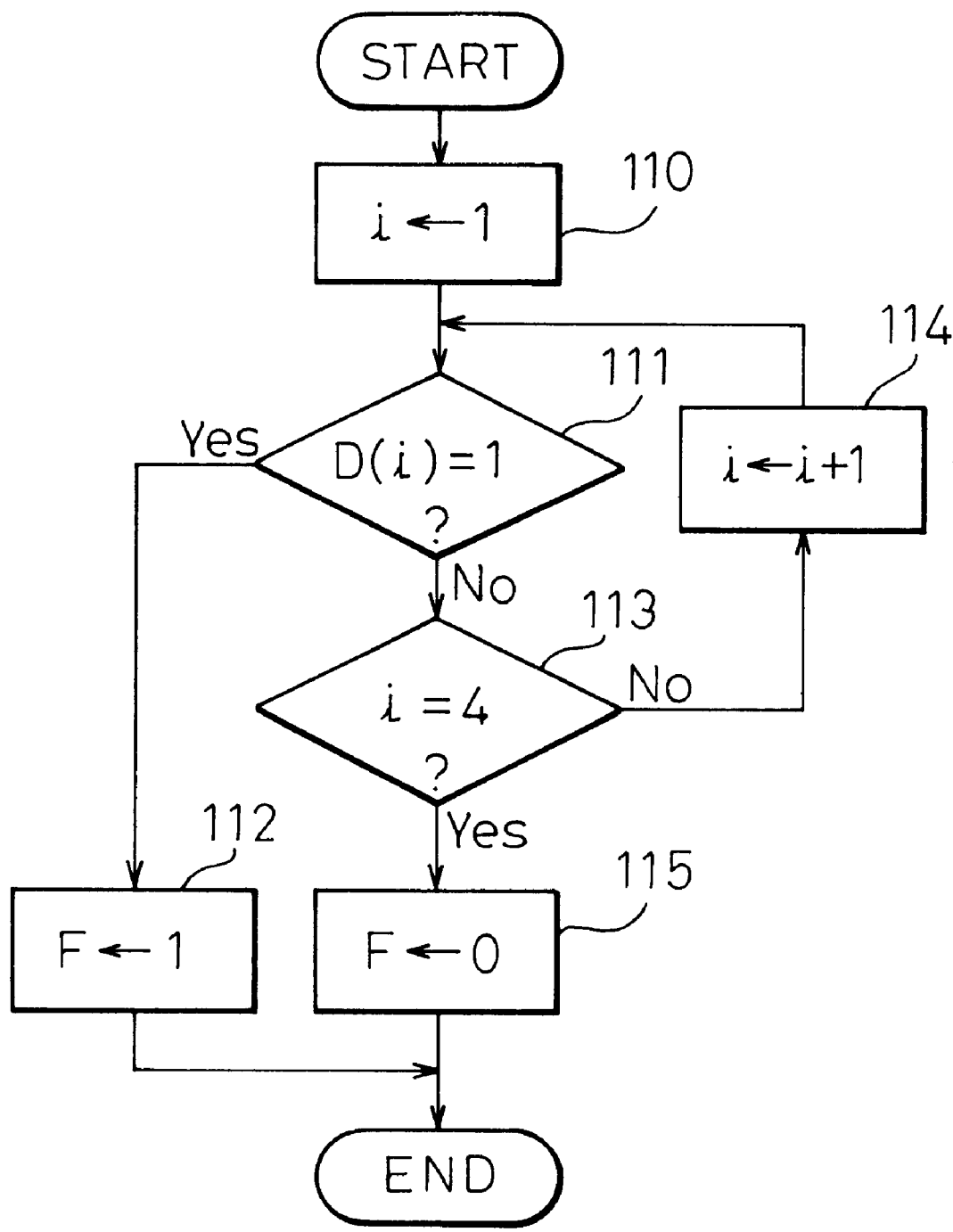
FIG. 11 is a flowchart of a routine to set a flag.

FIG. 11 is the flowchart of a flag setting routine, an index "i" which represents the phase is initialized to "1" at step 110.

At step 111, it is determined whether or not the i-th loss of synchronism flag D(i) is "1", and when the determination at step 111 is affirmative, this routine is terminated after a flag "F" which represents that the thermal printer loses synchronism is set to "1" at step 112.

When the determination at step 111 is negative, that is, when the loss of synchronism does not occur at the i-th phase, it is determined whether or not the index "i" reaches "4" at step 113. When the determination at step 113 is negative, the control returns to step 111 after the index "i" is incremented at step 114.

When the determination at step 113 is affirmative, that is, when the index "i" reaches "4", this routine is terminated after the flag "F", is set to "0" at step 115.

The PC 50 can recognize that a loss of synchronism occurs in the thermal printer when the flag "F" has become "1" if the PC 50 is observing this flag.

Following processings can be applied using programs installed in the thermal printer when the synchronism has been lost.

1. Printing a message which means that a loss of synchronism occurs.

2. Repeating the same action as just before a loss of synchronism has occurred.

3. Making the driving frequency which is set in the control unit 407 lower than just before a loss of synchronism has occurred.

4. Making the driving current which is set in the control unit 407 higher than just before a loss of synchronism has occurred.

5. Storing at least one of the driving frequency and the driving current in the non-volatile memory 4075 when a loss of synchronism has occurred.

The reference values $I_s$ (j) are determined based on the Equation [1] in the above-described embodiment, but it is possible to compensate for the reference values determined based on the Equation [1] in accordance with the speed of the stepping motor because the inductance of the exciting coil varies in accordance with the speed of the stepping motor.

According to the present invention, it become possible to surely detect a loss of synchronism and take adequate processings though the constant current exciting system is applied to the stepping motor by fetching the exciting current every predetermined period while a exciting pulse is being applied, and comparing it with a reference waveform after an excitation has completed.

What is claimed is:

1. A controller for a stepping motor comprising:

a stepping motor driving means for applying exciting pulses to the exciting coils of the stepping motor;

a current measuring means for measuring a current though the exciting coils of the stepping motor in response to the exciting pulses derived from said stepping motor driving means;

a sampling command generating means for generating sampling command every predetermined fixed period while said stepping motor driving means is applying a exciting pulse;

a current waveform observing means for fetching and storing the exciting current measured by said current measuring means every time a sampling command is generated by said sampling command generating means; and a determining means for determining that the stepping motor has lost synchronism when the current waveform observed by said current waveform observing means does not agree with a predetermined reference waveform within a predetermined fixed tolerance after a exciting pulse has been derived from said stepping motor driving means.

2. A controller for a stepping motor according to claim 1, wherein said predetermined reference waveform set in said determining means is a first-order lag waveform.

3. A controller for a stepping motor according to claim 2, further comprising:

a compensating means for compensating for said predetermined reference waveform in accordance with the speed of the stepping motor.

4. A controller for a stepping motor according to claim 2, further comprising:

an informing means for informing the occurrence of a loss of synchronism to a host computer when the loss of synchronism is detected by said determining means.

5. A controller for a stepping motor according to claim 2, further comprising:

an indicating means for indicating the occurrence of a loss of synchronism to a host computer when the loss of synchronism is detected by said determining means.

6. A controller for a stepping motor according to claim 2, further comprising:

a repeating means for repeating the same action as just before the loss of synchronism has occurred when the loss of synchronism is detected by said determining means.

7. A controller for a stepping motor according to claim 2, further comprising:

a lowering means for making the driving frequency of the stepping motor lower than just before the loss of synchronism has occurred when the loss of synchronism is detected by said determining means.

8. A controller for a stepping motor according to claim 2, further comprising:

an increasing means for making the driving current of the stepping motor higher than just before the loss of synchronism has occurred when the loss of synchronism is detected by said determining means.

9. A controller for a stepping motor according to claim 2, further comprising:

a storing means for storing a driving frequency and a driving current when the loss of synchronism occurs.

10. A controller for a stepping motor according to claim 1, further comprising:

a compensating means for compensating for said predetermined reference waveform in accordance with the speed of the stepping motor.

11. A controller for a stepping motor according to claim 10, further comprising:

an informing means for informing the occurrence of a loss of synchronism to a host computer when the loss of synchronism is detected by said determining means.

12. A controller for a stepping motor according to claim 10, further comprising:

an indicating means for indicating the occurrence of a loss of synchronism to a host computer when the loss of synchronism is detected by said determining means.

13. A controller for a stepping motor according to claim 10, further comprising:

a repeating means for repeating the same action as just before the loss of synchronism has occurred when the loss of synchronism is detected by said determining means.

14. A controller for a stepping motor according to claim 10, further comprising:

a lowering means for making the driving frequency of the stepping motor lower than just before the loss of synchronism has occurred when the loss of synchronism is detected by said determining means.

15. A controller for a stepping motor according to claim 10, further comprising:

an increasing means for making the driving current of the stepping motor higher than just before the loss of synchronism has occurred when the loss of synchronism is detected by said determining means.

16. A controller for a stepping motor according to claim 10, further comprising:

a storing means for storing a driving frequency and a driving current when the loss of synchronism occurs.

17. A controller for a stepping motor according to claim 1, further comprising:

an informing means for informing the occurrence of a loss of synchronism to a host computer when the loss of synchronism is detected by said determining means.

18. A controller for a stepping motor according to claim 1, further comprising:

an indicating means for indicating the occurrence of a loss of synchronism to a host computer when the loss of synchronism is detected by said determining means.

19. A controller for a stepping motor according to claim 1, further comprising:

a repeating means for repeating the same action as just before the loss of synchronism has occurred when the loss of synchronism is detected by said determining means.

20. A controller for a stepping motor according to claim 1, further comprising:

a lowering means for making the driving frequency of the stepping motor lower than just before the loss of synchronism has occurred when the loss of synchronism is detected by said determining means.

21. A controller for a stepping motor according to claim 1, further comprising:

an increasing means for making the driving current of the stepping motor higher than just before the loss of synchronism has occurred when the loss of synchronism is detected by said determining means.

22. A controller for a stepping motor according to claim 1, further comprising:

a storing means for storing a driving frequency and a driving current when the loss of synchronism occurs.

* * * * *